July 12, 1932.  C. GARDNER  1,867,002
CALCULATING MACHINE
Filed June 7, 1924   13 Sheets-Sheet 1

INVENTOR,
CLYDE GARDNER, DECEASED.
EDNA B. GARDNER, ADMINISTRATRIX.
By
ATTORNEY

July 12, 1932.  C. GARDNER  1,867,002
CALCULATING MACHINE
Filed June 7, 1924  13 Sheets-Sheet 4

INVENTOR
CLYDE GARDNER - DECEASED.
EDNA B. GARDNER, ADMINISTRATRIX
By J. L. Newton
ATTORNEY

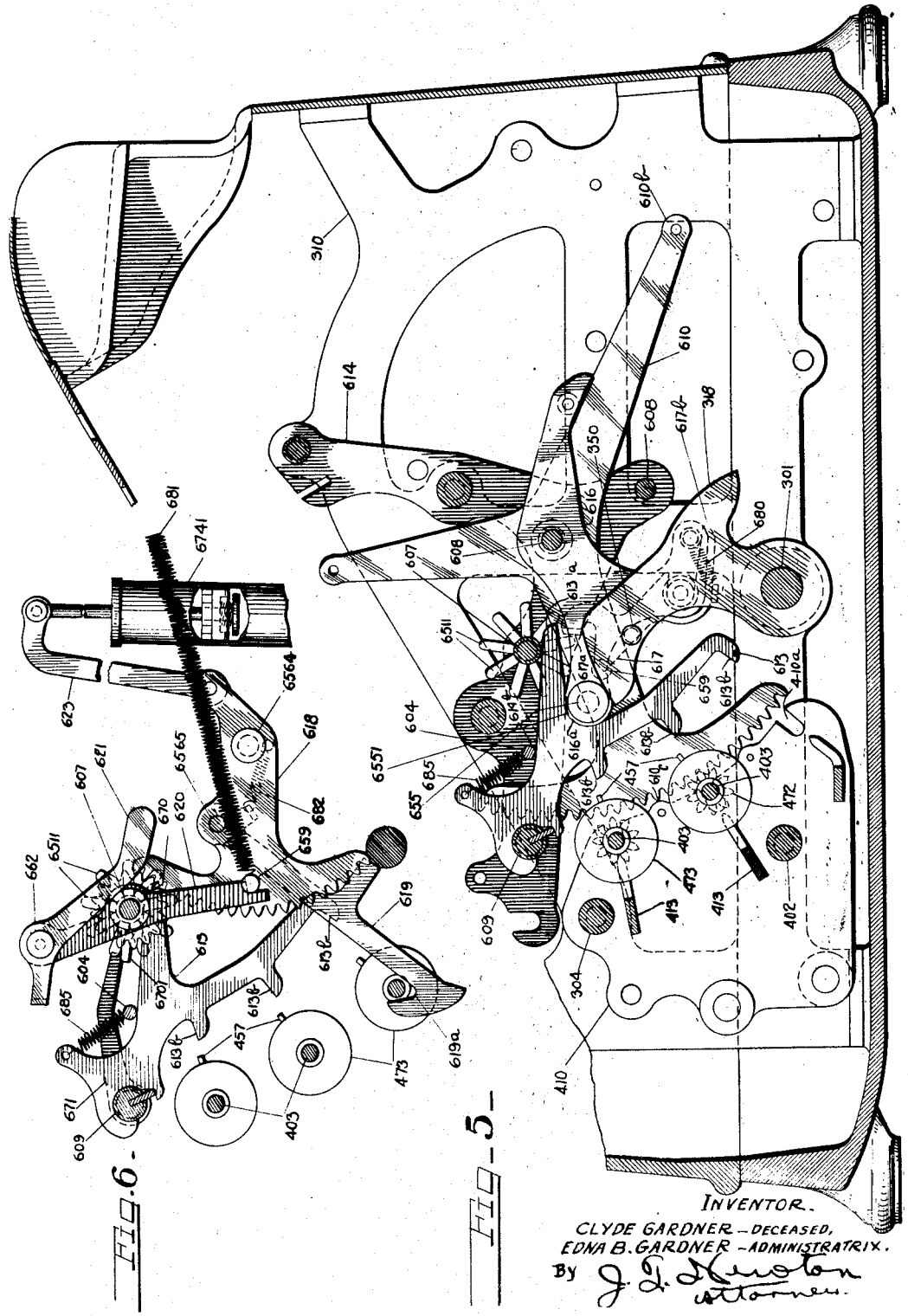

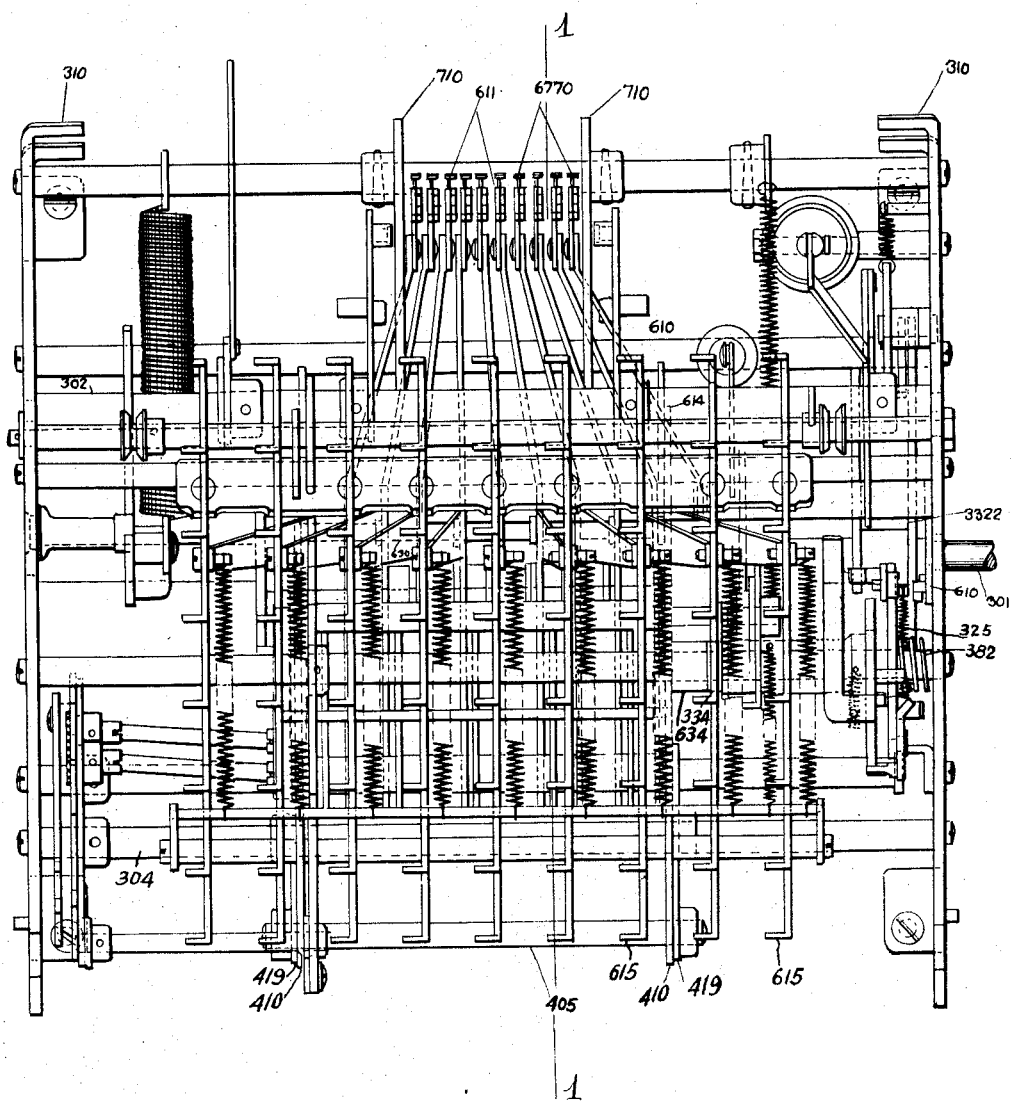

July 12, 1932.  C. GARDNER  1,867,002
CALCULATING MACHINE
Filed June 7, 1924   13 Sheets-Sheet 7
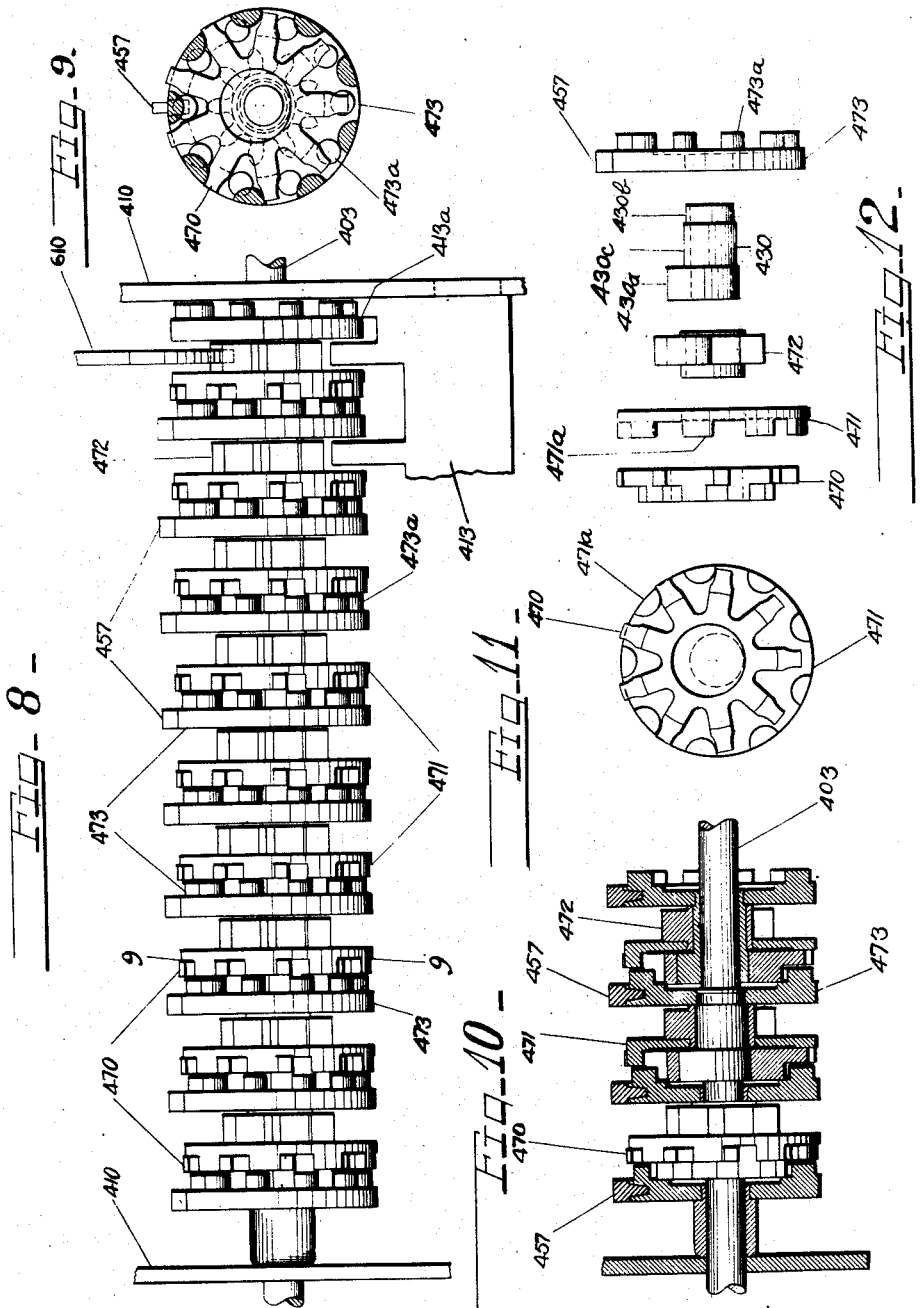
INVENTOR.
CLYDE GARDNER - DECEASED,
EDNA B. GARDNER - ADMINISTRATRIX.
BY J. T. Newton
ATTORNEY July 12, 1932.   C. GARDNER   1,867,002
CALCULATING MACHINE
Filed June 7, 1924   13 Sheets-Sheet 8
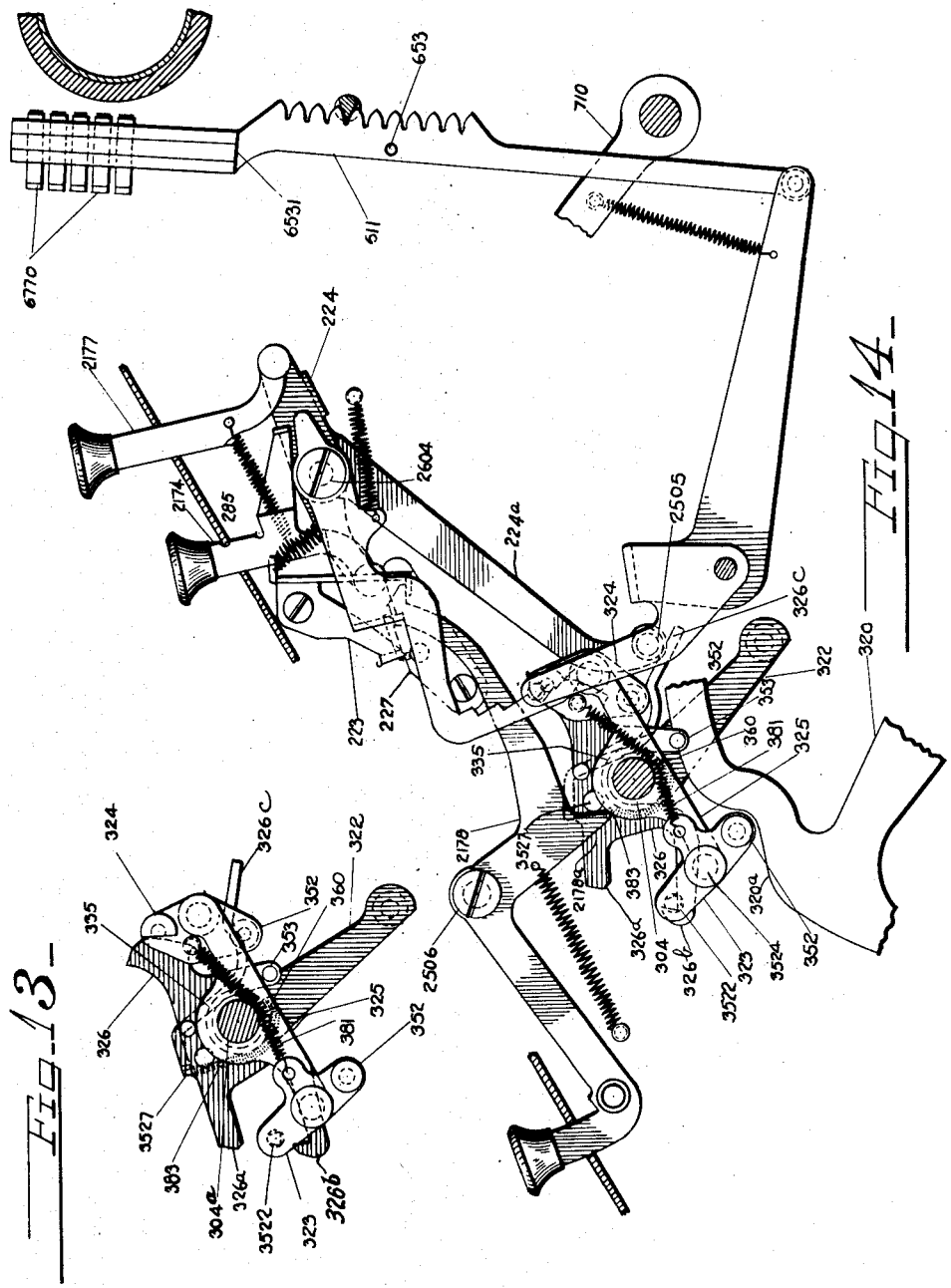
INVENTOR.
CLYDE GARDNER - DECEASED.
EDNA B. GARDNER - ADMINISTRATRI
BY
ATTORNEY July 12, 1932.    C. GARDNER    1,867,002
CALCULATING MACHINE
Filed June 7, 1924    13 Sheets-Sheet 9
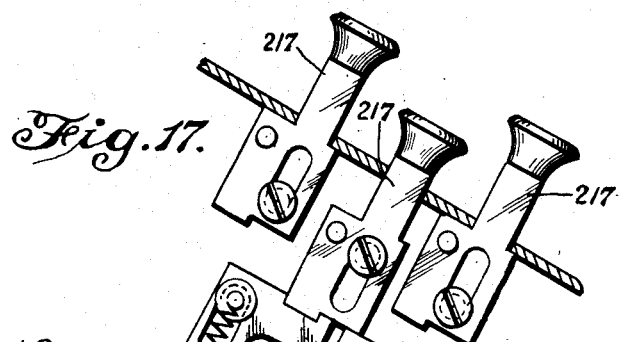
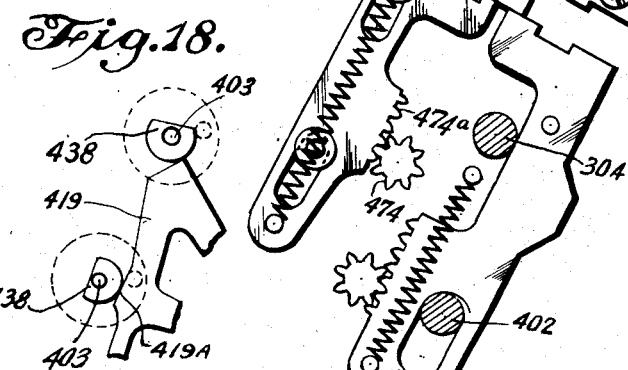
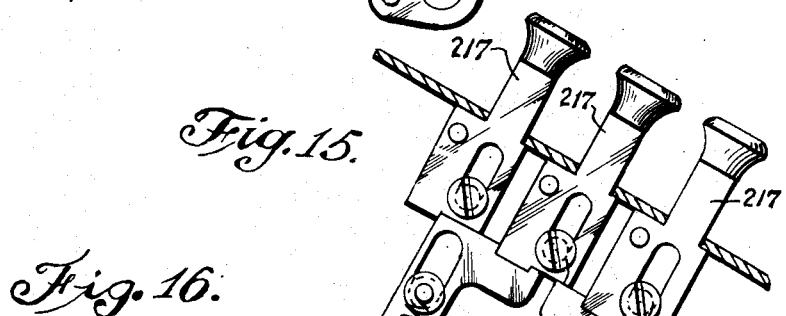
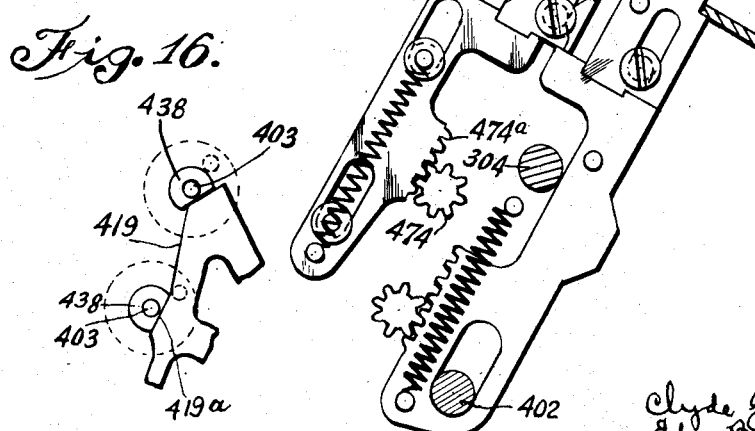

July 12, 1932.  C. GARDNER  1,867,002
CALCULATING MACHINE
Filed June 7, 1924    13 Sheets-Sheet 10

INVENTOR.
Clyde Gardner Deceased
Edna B. Gardner administratrix
BY J. G. Newton
ATTORNEY July 12, 1932.  C. GARDNER  1,867,002
CALCULATING MACHINE
Filed June 7, 1924   13 Sheets-Sheet 11
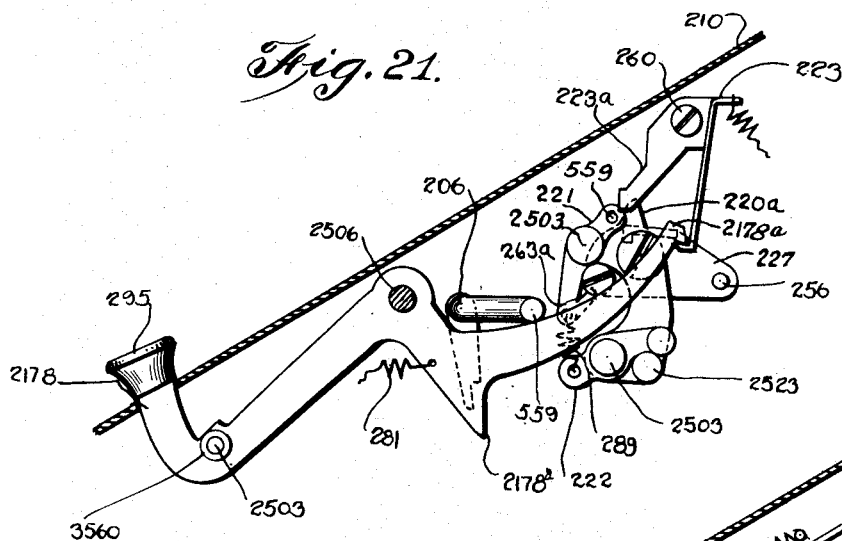
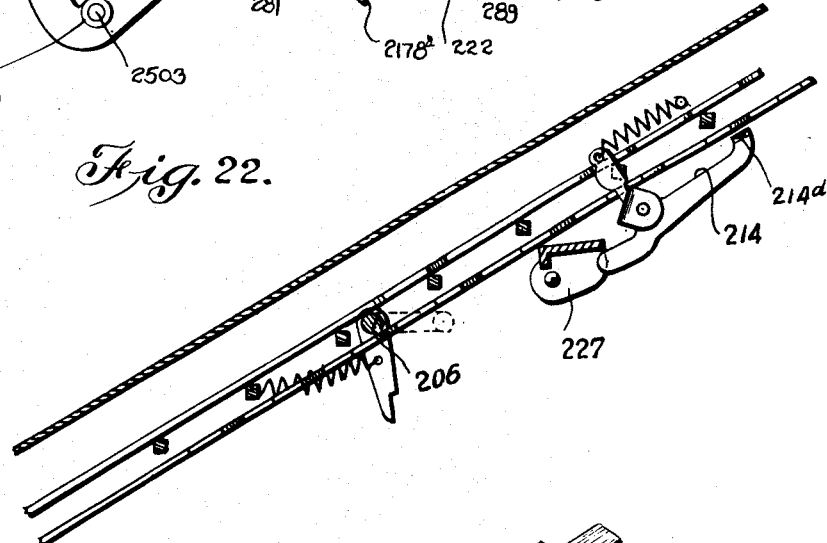
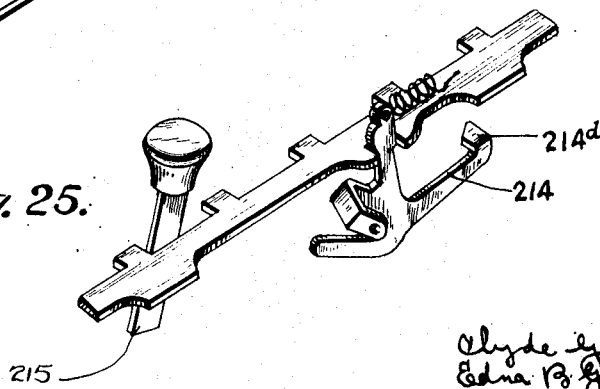

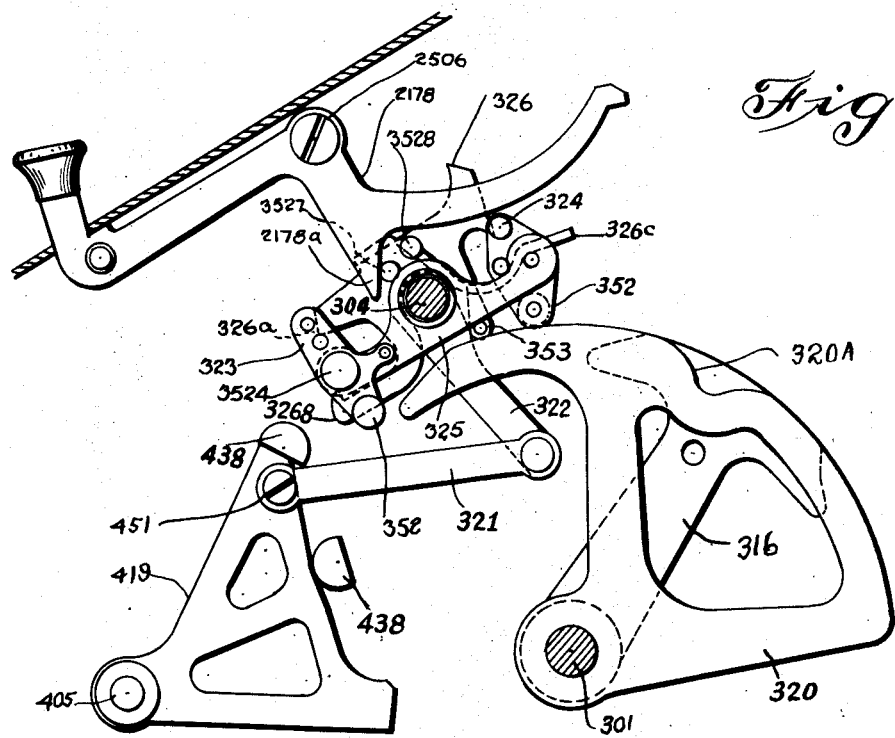
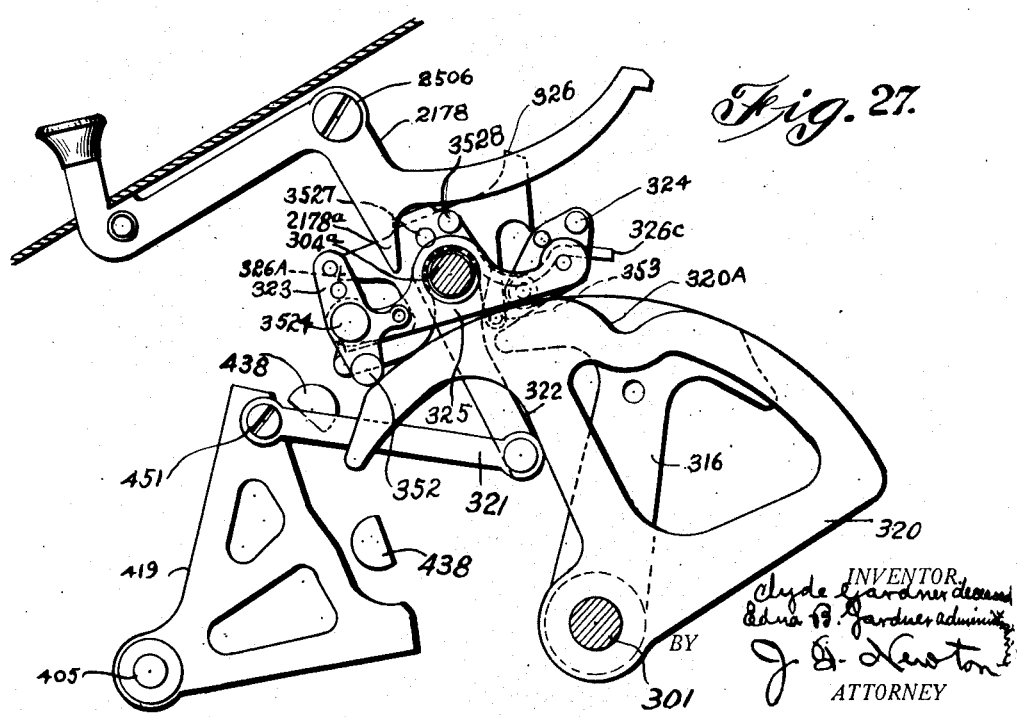

July 12, 1932.    C. GARDNER    1,867,002
CALCULATING MACHINE
Filed June 7, 1924    13 Sheets-Sheet 13

INVENTOR.
Clyde Gardner, deceased
BY Edna B. Gardner, administratrix
J. D. Newton
ATTORNEY Patented July 12, 1932

1,867,002

UNITED STATES PATENT OFFICE

CLYDE GARDNER, DECEASED, LATE OF EBENSBURG, PENNSYLVANIA, BY EDNA B. GARDNER, ADMINISTRATRIX, OF EBENSBURG, PENNSYLVANIA, ASSIGNOR, BY MESNE ASSIGNMENTS, TO GARDNER COMPANY, OF EBENSBURG, PENNSYLVANIA, A CORPORATION OF DELAWARE

CALCULATING MACHINE

Application filed June 7, 1924. Serial No. 718,678.

This invention relates to improvements in calculating machines and more particularly to means for transferring totals to display or recording devices. The invention is illustrated in connection with a machine having one or more counters and wherein registrations of amounts set up on a single keyboard may be effected on any of the one or more counters.

A primary object of this invention is to provide totalizing mechanism in a machine adapted to accomplish subtraction on one or more sets of counters simultaneously or successively during a single operation of the machine by simply turning the numeral wheels in the reverse direction,—all necessary borrowing being effected through the medium of the same differential gearing which in additive operations effects carrying. This carrying or borrowing between the successive numeral wheels of the machine is accomplished by a novel intermediate gear which is certain and positive in its action to effect such carry or borrow under all conditions of operatiton of the machine.

The foregoing and other objects and advantages will appear as the description proceeds in connection with the accompanying drawings in which the same reference numerals are used to designate the various parts in all the views and in which:

Fig. 5 is a right side elevation, partly in section, illustrating such of the mechanism as has to do particularly with the means for taking a total or sub-total, the parts being shown in their normal position.

Fig. 6 is a view showing the dash pot mechanism and certain of the parts of the machine which have particularly to do with taking a total or sub-total.

Fig. 7 is a plan view of the machine without the base, case, handle, or the keyboard, the parts being shown in their normal position.

Fig. 8 is an enlarged plan view of one set of numeral wheels.

Fig. 9 is an enlarged vertical cross sectional view of the numeral wheels taken along the line 9—9 of Fig. 8.

Fig. 10 is a view of a number of numeral wheels some of them partly in section.

Fig. 11 is an enlarged left end view of the internal gear and floating gear, the same being assembled on the eccentric hub.

Fig. 12 is a view of the parts of one numeral wheel unit arranged in the order of their assembly.

Fig. 13 illustrates the positions taken by certain parts of the machine when the sub-total key has been depressed.

Fig. 14 is a right side elevation, partly in section, with the total and subtraction keys depressed and the mechanism in its forward position.

Fig. 15 is a detail view showing the counter and control keys removed from the remainder of the mechanism.

Figure 16 is a view showing the counter control collars in the position of the parts illustrated in Fig. 15.

Figure 17 is a view similar to Fig. 15, showing the center counter control key depressed.

Figure 18 is a view showing the collars in accordance with Fig. 17.

Fig. 21 is a view similar to Fig. 19, with one of the total keys depressed.

Fig. 22 is a view similar to Fig. 20, showing the parts in position assumed when the key is depressed.

Fig. 25 is a view showing the column latch in association with the member key bars.

Fig. 26 is a view illustrating certain tripper mechanism removed from the machine and shown in normal position.

Fig. 27 shows the trip mechanism in position assumed when the operating handle is drawn partially forward.

*Accumulator operating mechanism*

Figure 1:
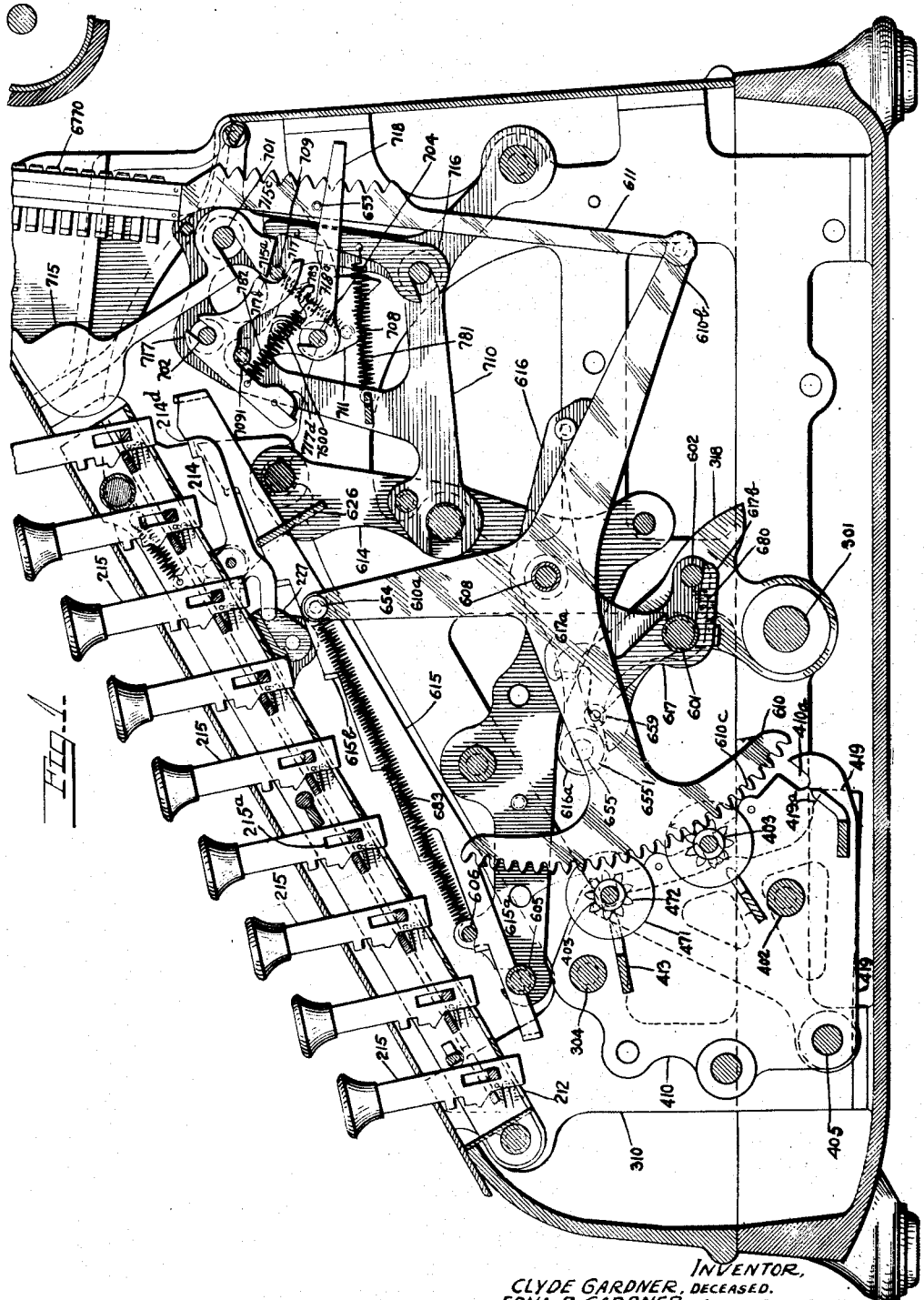
Fig. 1 illustrates a right side elevation shown partly in section taken on the line 1—1, Fig. 7, with the parts in normal position.

The counter or accumulator operating mechanism comprises pivoted three armed levers 610 (Fig. 1), one arm 610$^c$, Fig. 1, of each terminating in a rack, another arm 610$^b$ pivoted to a type bar 611 and the third arm 610$^a$ extending upwardly and pivoted to what I call an index blade 615 differentially stepped relatively to the numeral keys.

Figure 2:
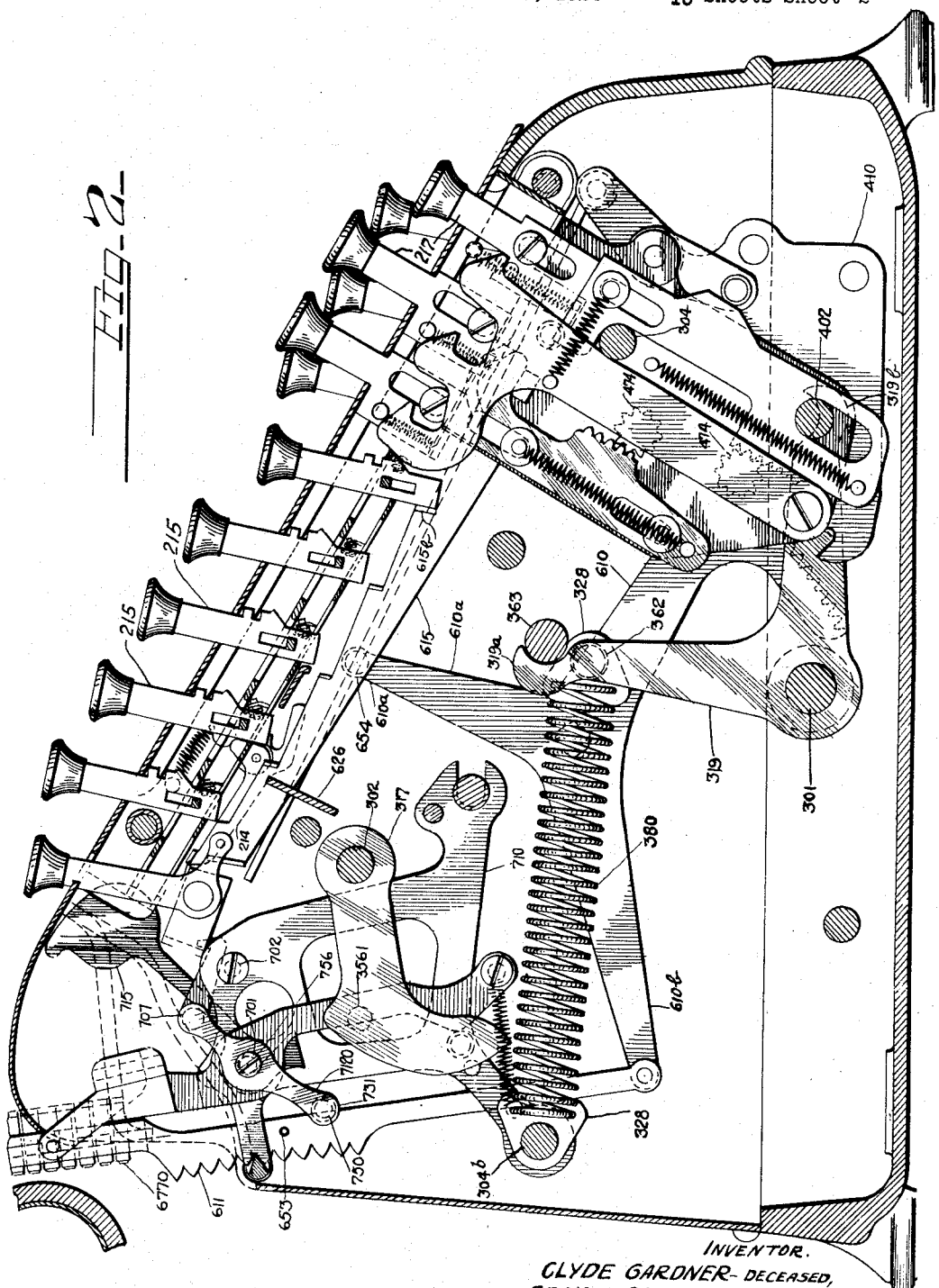
Fig. 2 is a left hand side elevation, partly in section of a view taken just inside the left hand side frame, showing the position of the parts when the 4 key has been depressed, with the mechanism in its forward position. This view also illustrates the counter control keys, upper, lower, and both, with the lower counter control key depressed.

All the index blades 615 (see Fig. 2) are loosely supported near the rear end by the screw studs 654 fixed in the upper arm 610$^a$, Fig. 2, of the rack arms 610 mounted on shaft 608. Index blades 615 are held in their rearward position by the rack arm latches 617, Fig. 1, coming in contact with the studs 659 riveted into the rack arms 610 against the tension of springs 683, one end of said spring 683 being fast to the screw studs 654, the other end being fast to the index blade upper guide and spring shaft 606 held in the auxiliary plates 614. A spacing shaft 605 resting in suitable slots acts as a forward support and a side guide for the index blades 615. On the lower edge of the index blade is a projection 615$^a$ which contacts with shaft 605 to limit the extreme forward movement of the index blades 615. Stop projections 615$^b$ on the index blades 615 all located in one vertical plane will, on operating the machine, coact with their respective key stop 215 (see Fig. 2) allowing index blades 615 to advance a distance proportional to the value of the key 215 depressed, or else contact with the stop portion 214$^d$ of the column latches 214 if no key 215 is depressed, said stop portion 214$^d$ representing the zero printing position of the type bar 611. The rear ends of the index blades 615 are guided by the rear index blade spacing strip 626, this strip, 626 being held in the rear-end of the auxiliary plates 614 in suitable slots and then locked in, so as not to be able to move.

Mounted on the front tie bar support shaft 304 and accumulator lower support shaft 402, Figs. 1, 5 and 7, are accumulator end plates 410 right and 410 left in fixed relation to the side frames 310. The end plates 410 have three slots 410$^a$ in each, providing a support for rods 403 on which the numeral wheel units are loosely mounted. These units will be more particularly described hereafter.

In the end plates 410 are slots which hold the pinion detent strips 413. The pinion detents 413 hold the numeral wheel gears 472 when they are out of mesh with the segmental racks 610$^c$. On the forward end of the rack arms 610$^c$ are cut 26 teeth. The in and out movements of the numeral wheel shafts 403 are brought about by the backward and forward movement of the accumulator control cams 419, one on each side of the accumulator end plates 410. The cams 419 are rigidly fixed to the shaft 405 so that the right and left cams 419 will move at the same time. On the right and left hand ends of the counter gear shafts 403 are fastened the gear shift collars 438, Figs. 3, 16 and 18. These collars have flat portions milled on them, and are fastened to shaft 403 so that when the cams 419 are rocked back or forth, and the counter control keys 217 have not been depressed, no action will be given to the counters due to the flattened portions of the collars coming in contact with cam 419$^a$, but when any counter control key 217 is depressed, it rocks the shaft 403 and collars 438 so that the flattened portions do not come in contact with the cams 419$^a$. To effect this rocking the "upper" and "lower" counter control keys actuate racks 474$a$ (Figs. 15 and 17) meshed with gears 474 fixed to the left hand end of the respective shafts 403. In this way the gears 472 are moved in and out of mesh with their associated racks 610.

Figure 3:
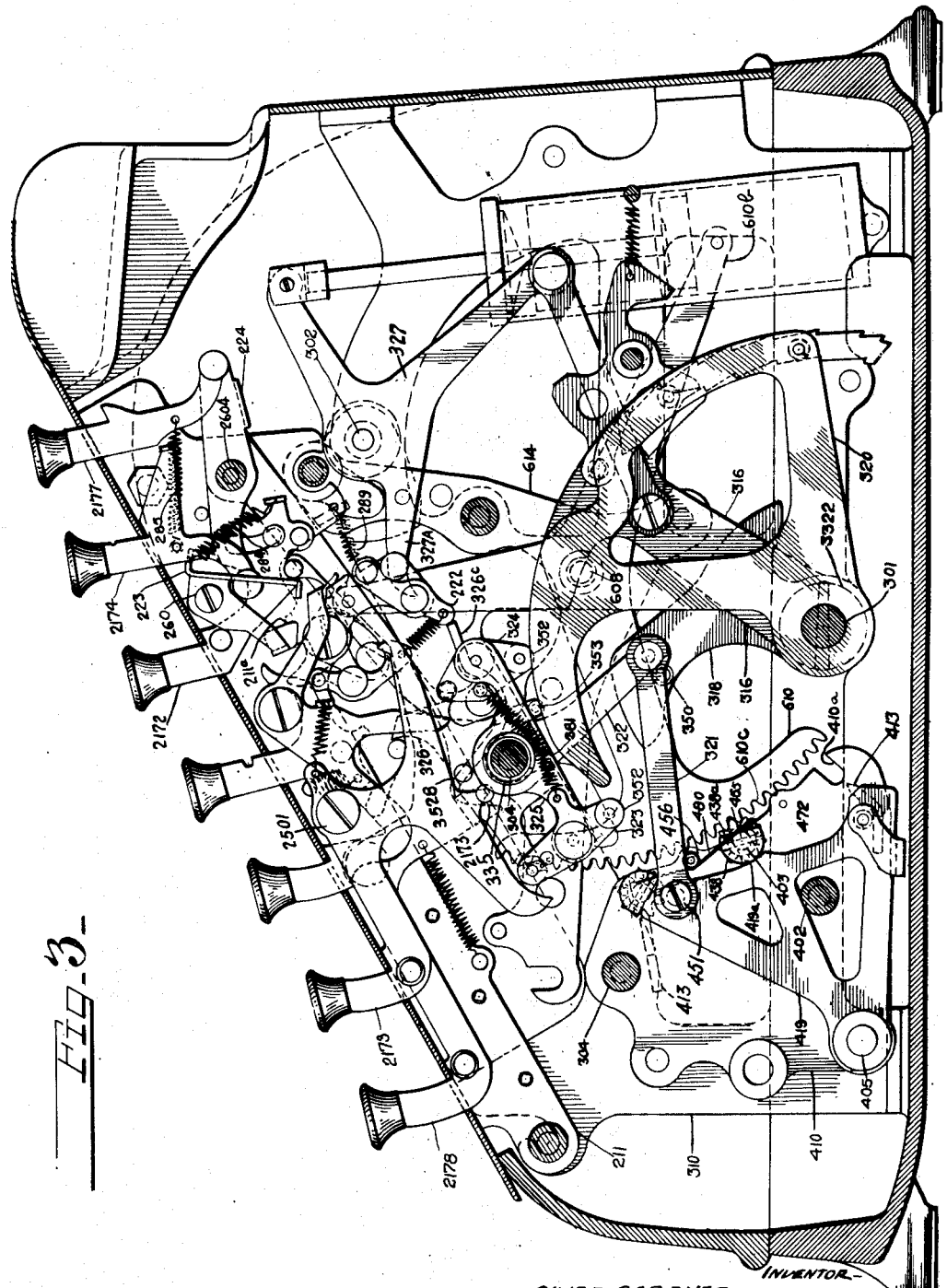
Fig. 3 is a right side elevation, partly in section, taken on a line just inside the right hand side frame, showing the total, sub-total, and subtract keys, also the mechanism that has to do particularly with the control and operation of the accumulating section, the parts being shown in their normal position.

Fastened in the end plates 410 are screw studs 456 on which are assembled counter springs 480, Fig. 3. These springs 480 keep the counters in mesh with the pinion detent strips 413, the cams 419 forcing the counters into mesh with the racks 610 against the tension of the springs 480, one spring 480 contacting each end of the counter gear shafts 403.

The right accumulator cam 419 has riveted into it a stud 451 on which a link 321 is loosely mounted. The other end of this link 321 is pivotally connected to the flipper shaft arm 322, the arm 322 being fastened to the hub 335, on its other end, this hub has fastened to it the flipper arm 325. At the forward end of the flipper arm 325 there is pivoted a front flipper 323 and on the rear end of said arm a similar stud pivotally supports a rear flipper 324, the two flippers being connected by a spring 381, Fig. 3, which serves to hold them yieldably in normal position.

Figure 4:
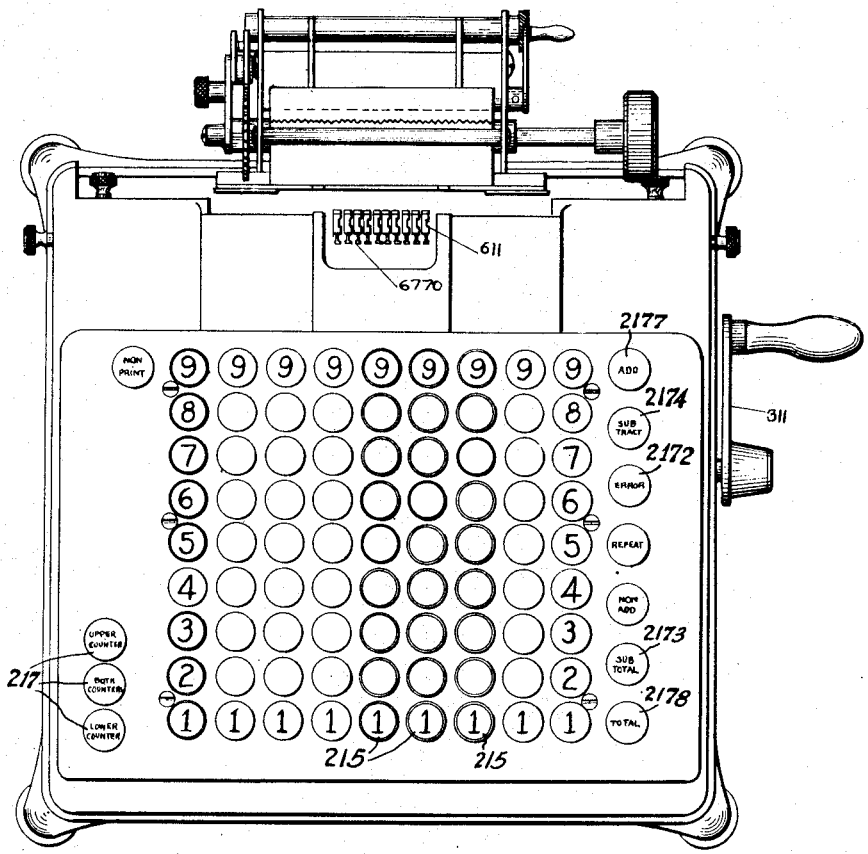
Fig. 4 is a plan view of the machine.

The whole unit is loosely mounted on the top support shaft 304. This unit is positioned from left to right on the support shaft 304 by the right auxiliary plate 614, Fig. 3, being pinned in a fixed relation to the side frames 310 and having the collar 634 and leather washer 334 between the auxiliary plate 614 and the arm 322 (see Fig. 7). On the right hand end, we have the compression spring 382 keeping the flipper mechanism up against the plate 614, also putting friction on the flipper mechanism so that it will not move unless it is moved by the operating cams 316 and 320, Fig. 3. The shaft 301 having bearings in the right and left side frames 310 has rigidly fixed to its right hand end the handle 311, Fig. 4. Just inside of the right side frame 310 is pinned through hub 3322 to the shaft 301 the arm 320, Fig. 3. The other end of the hub 3322 has fastened to it the flipper control arm 316 (see Figs. 3, 7 and 9). These arms 320 and 316 are so positioned on the shaft 301 that the front flipper 323 through its roller 352 can come in contact with the arm 320 and so that the arm 316 can come in contact with the rear flipper 324 through its roller 352 to impart a backward and forward motion to the flipper mechanism. The flipper arm 325 is held in its normal position against the stop screw stud 353 which is fixed in rock arm 326 and contacts arm 325 by the tension of the spring 383, one end of which is attached to rock arm 326, the other to spring stud 360 fixed in hub 335, Figs. 13 and 14. The flipper rock arm 326 has a forward extending arm 326ª, Fig. 13 which contacts the stud 3522 positioned in the upper part of the front flipper 323 when the machine is normal and the adding key 2177 is depressed, Fig. 3, and the counter control keys 217 are depressed, the counters are in mesh with the racks 610. If the handle 311 is pulled forward, the flipper mechanism, through having the front flipper 323 come in contact with the cam 320, will rock the arm 322 forward, which in turn will move the link 321 forward and this in turn will move the accumulator cams 419 forward allowing the collars 438 to get off the part 419ª of the cams 419. This allows the numeral wheels to get out of mesh with the racks 610 and into mesh with the detent strips 413. This takes place before any movement of the racks 610 and the numeral wheels stay in this position until the start of the return of the operating handle 311. At this time the rear flipper 324 comes in contact with the flipper control arm 316 rocking the flipper mechanism rearwardly and moving the numeral wheels in mesh with the racks 610, when if any rack 610 has been allowed to move from the zero position by having the in- dex blades 615 come in contact with the key stems 215, the amount corresponding to the key 215 set on the keyboard will be accumulated on the numeral wheels.

At the left of the machine, pinned to the shaft 301, is the arm 319 shown in Fig. 2 with its extending arm 319ᵇ contacting the stud 363 fixed in the left side frame 310 when the machine is normal, the arm 319ª shown in Fig. 2 contacting the stud 363 when the handle 311 is pulled forward, thus limiting the forward and backward motion of the handle 311 and through it all the rest of the mechanism. Fixed to the arm 319ª is the stud 362 on which is attached through spring terminal 328 the spring 380, its other end fastened through terminal 328 to support shaft 304ᵇ, this spring serving to hold the arm 319ᵇ in contact with the stud 363. When the shaft 301 is rocked and through it the lever 319 it will stretch main spring 380, storing energy sufficient to operate the machine on its return stroke. Just before the handle 311 is completely restored, the stud 350, Fig. 3, fixed in the right main restoring cam 318, comes in contact with the arm 322 and if the arm 322 is not in its rearmost position, it moves to that position. This operation takes place every time any amount is added.

Numeral wheels

The counters are illustrated more particularly in Figs. 8 to 12, inclusive, and comprise a series of groups of elements all arranged for rotation upon a shaft 403.

The counters are of a special type. They are so constructed that carrying is effected without the use of pawls, ratchets or springs. In place of these parts, a special type of gearing is used. The gearing here employed makes the carrying movement gradual; that is, it takes place during the whole of the rotation of the wheel which is transmitting the carry to the next higher order; and is thus to be distinguished from those systems in which the carrying is effected either during or after the last step of movement of the wheel below.

Each adding wheel (except the units) may be regarded as receiving movement in two ways, one directly from the actuators, and the other indirectly from the carrying devices. The special gearing functions during both movements. In the adding operation, it serves merely as a coupling gear to transmit the motion of the actuators directly to the adding wheels; while in the carrying movement it operates to transmit the carrying movement from the lower to the higher order.

Structurally considered, each counter consists of a series of groups of elements mounted on the rod 403. Each group of the series comprises a hub 430, having an eccentric 430ª at one end, a cylindrical part 430ᶜ in the middle, and a smaller cylindrical part 430$^b$ at the other end; a floating nine-toothed gear 470 on the eccentric 430$^a$; an internal nine-toothed gear 471 on the part 430$^c$ of the hub and having lateral pins 471$^a$ which mesh with the teeth of the floating gear 470; a nine toothed pinion 472 also mounted on the part 430$^c$ of the hub and secured to and moving with the internal gear 471; and a ten-toothed adding wheel 473 fixed to the hub at 430$^b$ and having lateral pin teeth 473$^a$ which are adapted to mesh with the teeth of the floating gear 470 of the next lower order.

Referring to Fig. 8, the first wheel 473 on the right, while identical with the other adding wheels 473, does not in fact serve as an adding wheel at all. It is used to cooperate with the aliner 413, one of the tines 413$^a$ of which enters between pins 473$^a$ of the wheel and prevents the same from rotating; and it also serves to prevent movement of the hub 430 which carries the eccentric 430$^a$ upon which is rotatably mounted the floating gear 470 of the units order. Since no carrying ever takes place in the units order, it is essential that the eccentric be held from rotation. Since this first wheel is not really an adding wheel at all, any other device which would serve the purposes described would suffice instead of the wheel shown.

In the figure referred to (Fig. 8), the second wheel 473 counting from the right, is the "units" wheel of the counter; the "tens" wheel, is the third; the "hundred", the fourth; etc., across the counter.

From the standpoint of function, each order of the counter may be considered as consisting of three parts; a ten-toothed counter wheel 473 and its attached hub 430 and eccentric 430$^a$ for the next higher order; a nine-toothed pinion 472 and attached a nine-toothed gear 471; and a nine-toothed floating gear 470 meshing with both the nine-toothed gear 471 and the ten-toothed adding gear 473.

When any adding wheel 473 is receiving motion directly from its actuator 610 through its nine-toothed gears 472 and 471, its floating gears 470, merely rotates upon its eccentric as an axis and transmits to its adding wheel 473, the number of steps of movement which the pinion 472 receives from its actuator.

In carrying, the axis of the floating gear 470 moves in a circular path the radius of which is the eccentricity of the eccentric. When any lower adding wheel 473 shall have made one complete rotation, its eccentric 430$^a$, and therefore the axis of its floating gear 470, will have made one rotation. The movement of the gear 471, is either held against rotation by its actuator 610, or its movement is controlled thereby; therefore, the floating gear 470 of that order is either prevented from rotating, or else has its rotation controlled by the actuator 610; but its axis is free to rotate under the control of the next lower adding wheel and this rotation of the axis of the floating wheel will cause the adding wheel to make one step of movement in adding direction. The gear 471 may be either stationary or moving, but the result is the same, one rotation of the axis of the floating gear will cause "1" to be added on the adding gear which it moves; or, if rotated in the reverse direction, will have "1" removed therefrom.

In order that the operation may be more apparent, the various steps in the entry of a number, and the taking of a total or subtotal, will be given. For this purpose, some number of three figures, as for instance, "654", will be taken. A larger number might be used, but with larger numbers analysis of the carrying becomes more involved; and the operation will be illustrated by a number of three figures just as well as by a larger number.

A number on a counter may, of course, be entered all at once, or it may be introduced by the addition of smaller numbers the sum of which equals the number under consideration. For illustration here, it will be assumed that the number "654" has been entered by the introduction of three amounts; "4", "50" and "600", in the order given. By using numbers of this kind, the explanation of the carry is simpler than if the amounts be so selected that two or more of the wheels move simultaneously, yet the principle will be just as apparent in one case as in the other.

Assume that the counter stands at zero. The "4" key of the units order is depressed and the machine operated. The units actuator 610 rotates the units wheel four steps, and this wheel will stand at "4". As the wheel turns, it rotates its eccentric 430$^a$ attached thereto but which stands in the tens order, and causes the floating gear 470 of that order to rotate the tens wheel four-tenths of one step, and this wheel will stand ".4" of one step away from home. This movement of the tens wheel, in turn will move the floating gear of the hundreds wheel, and this hundreds wheel will stand at ".04".

To enter "50", the "5" key in the tens order is depressed and the machine operated. The units actuator 610 does not move. The tens actuators 610 moves the tens wheel five steps, and adds "5" thereto. This wheel already stands four-tenths of one step away from home, due to the operation of the units wheel, and the tens wheel will therefore stand at "5.4". Movement of the tens wheel five steps causes the hundreds wheel to move five-tenths of one unit and this will be added to the four-hundredths of one step which was put thereon by the units wheel, and this wheel will stand at ".54".

To enter "600", the "6" key in the hundreds order is depressed and the machine operated. Since nothing is entered in either the units or the tens wheel, these wheels do not move. The hundreds wheel moves six steps, and "6" will be placed on this wheel. This will be added to the ".54" already on the wheel, and this wheel will stand at "6.54".

The units wheel will now stand at "4"; the tens wheel at "5.4"; and the hundreds wheel at "6.54". The fractions are disregarded as ineffective, and in fact are automatically discarded in the total taking operation.

While only the units, tens and hundreds wheels have been considered, it is to be understood that movement of all of these wheels has affected, in diminishing amounts every other wheel above, and therefore all of these upper wheels carry fractions of a single unit.

In taking a total or sub-total, the wheels, as hereinafter described, are run to zero one after the other, beginning with the units. The mechanism for accomplishing this is described elsewhere. As the actuator 610 moves the units wheel to zero, it rotates the wheel backward four steps and stops. The wheel in rotating backward withdraws from all of the upper wheels those fractions of one unit which stand on those wheels by reason of the units wheel being four steps away from home. Thus it withdraws from the tens wheel .4 of one unit; from the hundreds wheel .04, and from the higher wheels, those gradually diminishing fractions which are on those wheels by reason of the units wheel being four steps away from home. The tens wheel is then rotated to zero, and as it moves backward it withdraws from the hundreds wheel the .6 of one unit which it has placed thereon, and from all of the higher wheels those gradually diminishing fractions which it has put on these wheels. As the hundreds wheel goes to zero it withdraws from the wheels above those gradually diminishing fractions which it has placed on these upper wheels; and so on throughout the series.

*Total key*

Figure 19:
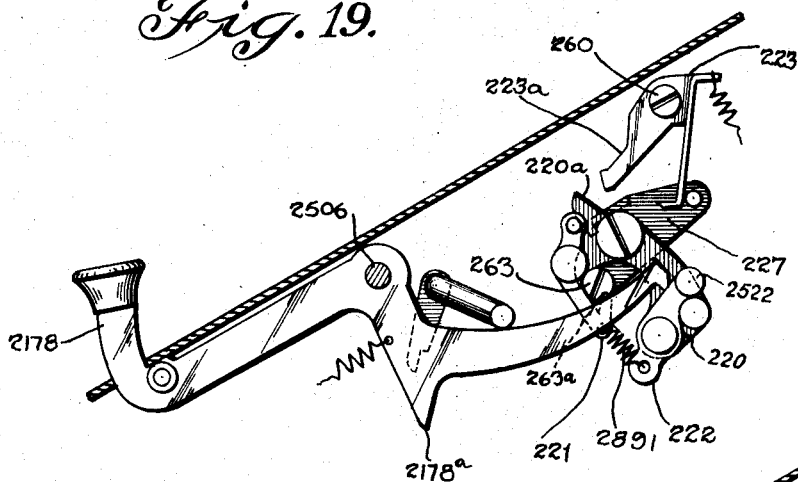
Fig. 19 is a detail view of the total key and certain parts associated therewith as removed from the machine.
Figure 20:
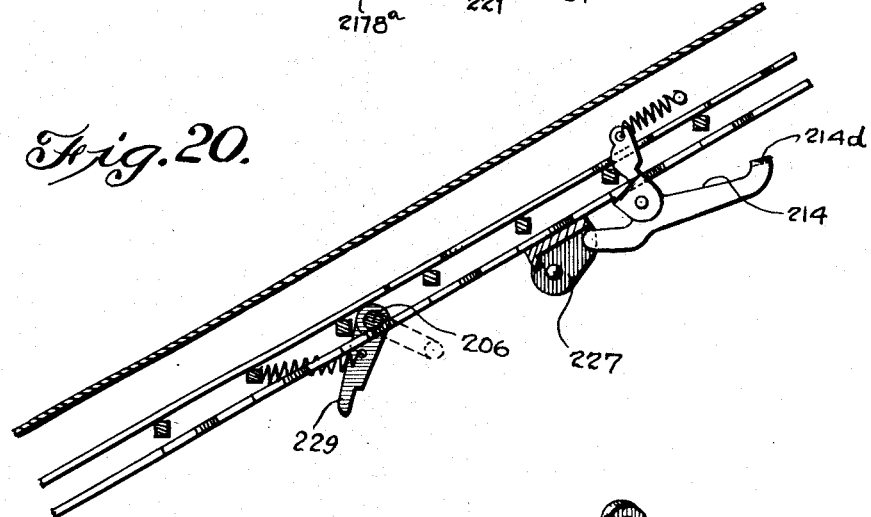
Fig. 20 is a view to the left of the parts shown in Fig. 19 and showing the manner in which the total key controls certain slide members.
Figure 23:
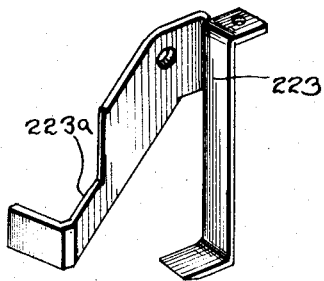
Fig. 23 is a perspective of a latch member used in connection with the mechanism of Fig. 19.
Figure 24:
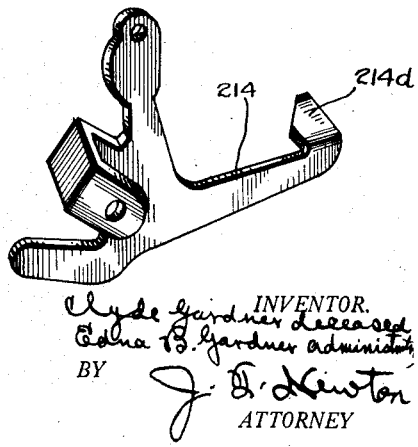
Fig. 24 is a perspective view of a column latch.
Figure 28:
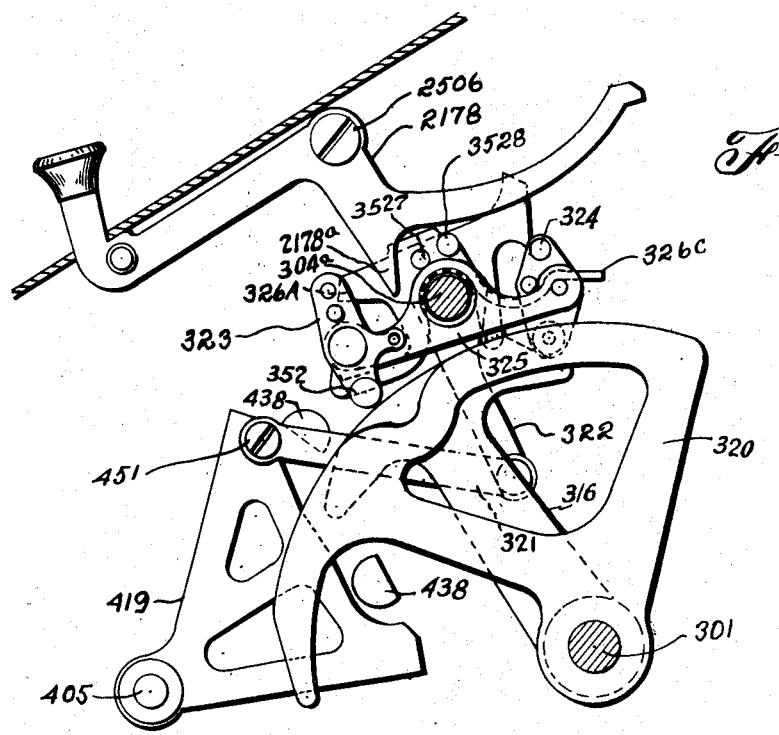
Fig. 28 shows the trip mechanism with the operating handle in full forward position.
Figure 29:
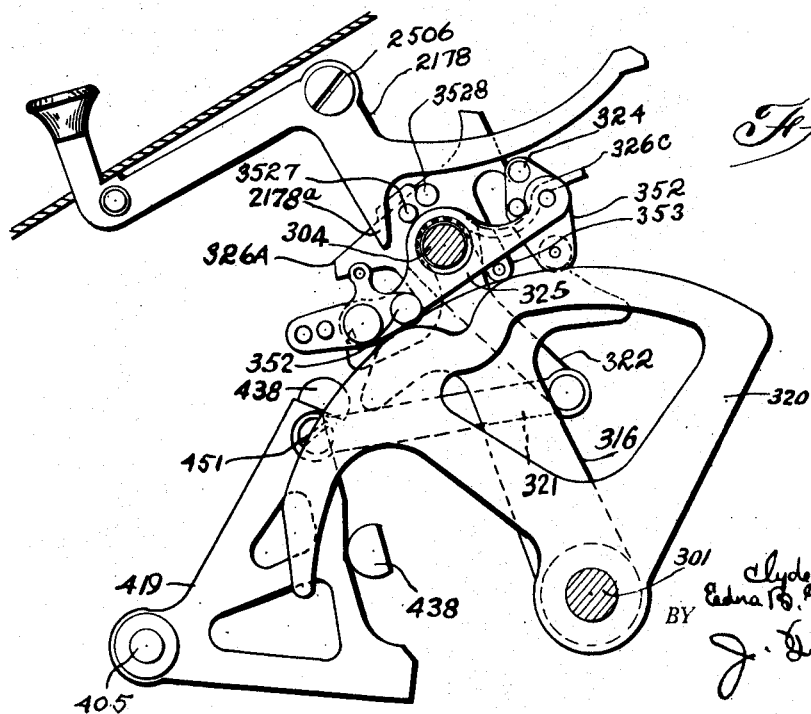
Fig. 29 is a view showing the action of the tripper mechanism after the handle returns.

As shown in Figs. 14, and 26 to 29, there is secured to the right hand side of the keyboard end plate 211, a stud 2506, whereon is pivotally mounted a total key lever 2178, the rear part of which comes in contact with a stud 263, Figs. 19 and 21, riveted in the numeral key restoring bail 227, Figs. 1, 20 and 22, and rocks the bail 227, which in turn releases the column latches 214 from engagement with the index blades 615, Fig. 1. When the key 2178 is fully depressed, it is held in this position by the total, sub-total latch 223, Figs. 19 and 21. A downward extending arm 2178ᵃ on the total key 2178 also comes in contact with the stud 3527, Figs. 13, 14 and 26 to 29, in the flipper rock arm 326 rocking the arm 326 so that it will hold the rear flipper 324 out of engagement with the cam while the hook 326ᵇ will be moved into the path of the stud 3522 so that when the handle 311 is operated, the cam 320 will contact the roll stud 352 in the lower end of the front flipper 323 and as the stud 3522 fixed in the upper end of flipper 323 has nothing to keep it from being moved rearward, it does not operate the flipper mechanism and as the numeral wheels are in engagement with the racks 610 when the machine is normal, this will leave the numeral wheels in mesh with the racks 610 during the forward movement of the operating handle 311. The numeral wheels being reset to zero by having the pins 457, Figs. 5 and 6, fastened in the adding gears 473, coming in contact with ledges 613ᵇ of the totaling hooks 613, then the stud 352 in the lower end of the flipper 323, contacts the cam 320ᵃ, Fig. 14, located midway in the arm 320. This will rock the arm 323 around the stud 3524 so that the stud 3522 will contact the hook arm 326ᵇ, rocking the flipper mechanism frontward and thereby allowing the numeral wheels to be forced out of mesh with the racks 610 by the spring 480, leaving the numeral wheels in the zero position.

*Sub-total*

The sub-total key 2173 is pivotally mounted on stud 2501, Fig. 3, which is riveted in the right keyboard end plate 211. Should this key be depressed it will rock the numeral key restoring bail 227 in the manner described for the total key, releasing any numeral keys 215 that may be depressed and remove the column latches 214 from the index blades 615. It also will be held in its depressed position by the latch 223. The key 2173 also has a lower extending arm 2173ᵃ which contacts pin 3528, Fig. 3, riveted in rock arm 326, rocking the arm 326 so that the rear flipper 324 will not come in contact with the arm 316, Figs. 26 to 29, also the stud 3522 on the front flipper 323 will not contact either the front prong 326ᵃ or hook 326ᵇ of the rock arm 326. This will keep the flipper 323 from operating the flipper mechanism. In this condition the back and forth movement of the operating handle 311 will not rock the numeral wheels in either direction, and thus the numeral wheels will remain in mesh with the racks 610 during the forward and backward movement of the operating handle 311, the numeral wheels being thus reset to zero and then rotated again to the position in which they stood at the beginning of this operation. This provides means for printing a total without clearing the numeral wheels.

In the right end plate 211 on the same screw stud used as a trunnion for the bail 227 is pivotally mounted the key release arm 220, Figs. 19 and 21, which is held in its rearward position by the spring 289, Fig. 3. On the upper end of arm 220 is loosely held the hook 221 which when in its normal position engages the flat 263ᵃ milled on the stud 263 riveted in the bail 227. On the lower end of the arm 220 is loosely held the key release flipper 222, a spring 2891 being connected between 221 and 222, holding both in their normal positions. The arm 222 has on its rear end the stud 2522. Pinned to shaft 302, Fig. 3, near its right end is the dash pot arm 327, the forward end 327ᵃ of which is in line with the stud 2522, on the arm 222. On every operation of the machine this arm 327ᵃ moves upward past the stud 2522, no action being given to the arm 220 on its upward stroke due to the spring 2891, but on the return of the arm 327ᵃ it contacts the stud 2532 rocking the arm 220 around its pivot, due to the arm 222 resting against the stud 2523. The upper end 220ᵃ of the arm 220 coming in contact with a forward extending arm 223ᵃ of the latch 223, will release the total or sub-total key, if either is on the latch 223. This takes place just at the end of the return of the operating handle 311. The latch 223 is loosely mounted on the stud 260 fixed in the end plate 211 of the keyboard. It is held in its normal position (see Fig. 3) against the upper edge of the slot 211ᵃ in the end plate 211 by the tension of spring 284, one end of spring 284 attached to the latch 223, and the other end to the error key 2172. The rearward rocking of the latch 223 takes place every time the mechanism is operated by the handle 311.

*Total and sub-total correcting mechanism*

The total hook arm spacing shaft 609, Figs. 5 and 6, is mounted loosely between the plates 614, and upon the left end of 609, extending through the plate 614, is fastened the arm 671. The arm 671 is used to hold the total hooks 613 out of the path of the adding gear stop pins 457 against the tension of the springs 685, one end of which are fastened to the total hooks 613, the other end of which is fast to the fixed shaft 604. The left end of the 604 shaft is used as a stop by the arm 671 to limit the forward motion of the total hooks 613. A little to the rear of this shaft 609 is loosely mounted between plates 614 the pin shaft 607. On the left end of this shaft is fastened the arm 6701 and on the right near the end is fastened the gear 670. Between the plates 614 spaced every 40 degrees around the shaft 607 are the pins 6511 spaced equal distances apart and in line with the rack arm latches 617 forming a spiral line.

On the right end of tierod 608ᵃ is screwed the stud 6564 upon which is loosely mounted the total rack segment 618 which meshes with the gear 670. On the right end of the shaft 607 next to the gear 670 is loosely mounted the arm 620 which engages the pin 659 riveted in 618. The spring 684, Fig. 7, one end fast to the arm 620, Fig. 7, the other end of which is fast to the shaft 606 keeps the latch 620 in engagement with the pin 659 of the total segment 618. On the upper end of the latch 620 is loosely held by the stud 662 the latch control arm 621. The 621 arm is positioned so that the arm 229, Figs. 20 and 22, can come in contact with it. The arm 229 is fastened to the crank 206, which is loosely mounted in the right keyboard end plate 211 and partition plate 212, Fig. 1. The end of the crank 206 is in the path of the total 2178 and sub-total 2173 keys so that when either of these keys 2178 or 2173 are depressed, it will rock the arm 229 through the crank 206, which in turn will move the control arm 621, Fig. 6, unlatching arm 620 and allowing the total rack segment 618 through its spring 681 to revolve the shaft 607 one complete revolution. The turning of the shaft 607 is governed by the total dash-pot 6741 being connected to segment 618 through the link 623. The segment 618 has a link 619 loosely connected to it by the stud 6565, said link being held in a rearward position by the spring 682, when the latch 620 is holding the segment 618, but when the segment 618 has revolved the shaft 607 one revolution the link 619 will be brought into the path of the stud 350, Fig. 5, in the right hand cam 318 so that when the handle 311 is operated it will restore the segment 618 to its latched position, by the stud 350 coming in contact with the hooked end 619ᵃ of 619. Meanwhile segment 618, in rising, has caused pin 659 to engage control arm 621 and move the same away from arm 229, so that latch 620 will be free to reengage the segment. When the latch 620 engages the segment 618, the arm 6701 fastened to the left hand end of the shaft 607 will be holding the arm 671 so that the total hooks 613 will be out of the path of the pins 457 in the adding gears 473, also holding the rear extending arm 613ᵃ of the hooks 613 away from the tabs 617ᵃ on the latches 617 (see Fig. 5).

As stated above, the racks 610 are restored against the tension of springs 683 by the latches 617 coming in contact with the studs 659 in the racks 610. The latches 617 are pivotally mounted on the spacing shaft 601, Fig. 1, this shaft and stop shaft 602 being riveted at each end to the right and left arms 616, Figs. 1 and 5, forming a swinging frame which is held on the lower tie rod 608 between the plates 614. On the forward ends 616ᵃ of the arms 616 are riveted the studs 655 on which the rolls 6551 are held, these operating on the right and left main restoring cams 318 to restore the racks 610 through the latches 617. The latches 617 have tabs 617ᵃ extending to the left which come in the path of the pins 6511 on the shaft 607. These tabs also lie in the path of a rear extending arm 613ᵃ of the total hooks 613, so that when the shaft 607 is revolved in an anti-clockwise direction, upon depression of the total key 2178 or sub-total key 2173 the segment 618 will be unlatched, due to the arm 6701 revolving away from the arm 671, thus the rear extension 613ª of the total hooks 613 will be allowed to come in contact with the tab 617ª on the latches 617 and then the first pin 6511 in the right hand end of the 607 shaft will move the latch 617 rearward so that the first total hook 613 can go forward until it comes in the path of the adding gears 473 when the further turning of the shaft 607 and pin 6511 will take the latch 617 out from under the stud 659, this allows the rack 610 to revolve around the shaft 608, Fig. 1, through the tension of the spring 683 and in turn to revolve the adding gear 473 until the pin 457 comes in contact with the ledges 613ᵇ on the total hooks 613, which is the zero position. After the first total hook 613 has been let forward and the rack 610 has revolved the first adding wheel 473 due to the pins 6511 being spaced 40 degrees apart around the shaft 607, the second total hook 613 will be let forward and then the second rack 610 will be unlatched and so on across the numeral wheels. In this way, due to the numeral wheels being in series or train, all necessary carrying is done as each lower order wheel correctly positions the next higher order wheel before the higher order wheel's total hook 613 is allowed to come in the path of the higher order wheel, and as the type bars 611 are loosely connected to the rear end 610ᵇ of the rack arm 610, this will bring the correct type 6770 to the printing line so that when the handle 311 is operated after the total 2178 or sub-total key 2173 has been depressed the correct amount that has been added or subtracted on the numeral wheels will be printed. Also when the handle 311 is all the way forward it allows the latches 617 to be restored by the springs 680 under the pins 659 in the racks 610, due to the cams 318 moving forward and allowing the frame 616 to drop the latches 617, thus restoring the racks 610 to their normal position on the back stroke. The latches 617 are held in normal position by having a rear extending arm 617ᵇ come in contact with the shaft 602 through the action of springs 680. The only difference between the total operation and the sub-total operation is that on the sub-total the numeral wheels remain in mesh on both the forward and backward stroke of the machine, leaving the total added in the machine while the total operation allows the wheels to remain in mesh on the forward stroke, taking them out of mesh at the first part of the return stroke, leaving the wheels standing at zero, the operation of the numeral wheels, total hooks 613 and the pin shaft 607 being the same.

Subtraction

On the operation of subtraction, the timing of the accumulator is the same as when taking a total and is brought about by depressing the subtraction key 2174, Figs. 3 and 14, which is loosely connected to the forward end of the control arm 224, the adding key 2177 being loosely connected to the rear end. The control arm 224 is loosely mounted on the stud 2604 fixed in the end plate 211, the depression of one key restoring the other key, the spring 285 holding them in place. The arm 224 is formed U-shaped and on the inside of the plate 211 has a forward extending arm 224ª on which a roll 3560 is loosely held by the stud 2505. The rock arm 326 has a rearward extending arm 326ᶜ so that when the subtraction key 2174 is depressed it rocks the forward extending arm 224ª downward and in turn rocks the arm 326 through the extension 326ᶜ to the same position as when totaling. This allows the accumulator to have the same timing as when totaling without releasing the column latches 214 so that when any keys 215 are depressed they will allow the racks 610 to revolve the adding gear 473 clockwise, or in the opposite direction from adding, and the floating gear or intermediate gear 470 will, when the nine tooth pinion 472 makes one complete revolution, turn the lower order wheel 473 forward one tenth of a revolution, or one unit, and the next higher order wheel 473 back one tenth of a revolution, or one unit, thus effecting a borrowing. If nine was subtracted from a clear counter, the numeral wheels would stand as follows: The units 473 would be at one and the next higher order wheel would be at nine and all the rest of the wheels would be at zero where they would remain until a total was taken when the first total hook 613 would be allowed to stop its rack 610 at the one position and the next total hook 613 would allow the next higher wheel to go to nine and at the same time turn its next higher order wheel back one unit so that when its total hook 613 was allowed to get in the path of the wheel 473, the lower order wheel would have borrowed one, making that wheel nine, and so on across the counter. By this method direct subtraction is accomplished without any other means than stated above.

It is obvious that one or more counters could have amounts subtracted from or added to them at one operation of the mechanism by the handle 311, as each counter is complete in itself. The only difference between the operation of adding and subtracting is that the numeral wheels are turned in the reverse direction.

Hammer section

As each index blade 615 moves forward its associated type bar 611 will be raised a proportional distance, and when the index blade 615 comes to rest against the key 215, a type 6770 corresponding to the value of the key 215 depressed, will be brought into printing position.

The upward movement of each type bar 611 carries with it the pin 653, Fig. 1, fixed to bar 611. The pins 653 normally hold the rear end of trigger arm 718 in a depressed position against the tension of spring 782, one end of which is fastened to arm 718, and the other to the hammer lock arm 717, the spring 782 keeping arm 717 in its normal position. The arms 718 are loosely mounted on a slotted shaft 704, said shaft being fixed to trip cams 711, the trip cams 711 being mounted on the shaft 7091 having bearings in the end plates 710. The shaft 708 positioned in the cams 711 acts as a retainer to hold the arms 718 in place in the annular grooves of the shaft 704 although allowing the arms to move freely about the shaft. The trip cams 711 are held in their normal position by the stop pin 7500, fixed in cams 711, held against the end plates 710 by the tension of the 783 springs, one for each trip cam 711, one end of the spring 783 being attached to the shaft 708, the other end to shaft 709 fixed in the end plates 710. Pinned to the shaft 302, Fig. 2, are the cam arms 317, one on each side of the end plates 710. The rear end of the cams 317 contact the rolls 731 held to the right and left hammer restoring arms 7120 by the stud 750, said arm being loosely mounted on the hammer shaft screw studs 756 screwed in each end of the hammer shaft 701. The upper end of the arms 7120 have fixed to them the shaft 707 which also spaces the arms 7120 apart. The shaft 707 is used to restore the hammers 715.

When the cams 317 are moved downward they allow the arms 7120 to go rearward allowing the hammers 715 to be stopped by the ledges 717ᵇ, Fig. 1, of the hammer lock arms 717 which are mounted on the grooved shaft 702, held at each end in the end plates 710. On the further movement of the arm 317, the stud 3561, Fig. 2, will contact the trip cams 711 swinging them forward and through them the arms 718. If a type bar 611 has moved upward, due to the depressing of a key 215, the rear of the arms 718 will move upward until the ledges 718ᵃ are in the path of the rearward extending arm 717ᶜ of the arms 717. The further forward movement of the arms 718 will release the ledges 717ᵇ from contact with the ledges 715ᵃ of the hammers 715 which are loosely mounted in the grooved shaft 701, the hammers 715 being held in their forward position against the tension of the springs 781 on the spring arms 716. The spring arms contacting the hammers 715 on the lower extending arm 715ᶜ, will force the hammer 715 to strike rearward, striking the type 6770, which have been raised to printing position and causing same to record its value on the tape. On the return movement of the mechanism, the arms 711 will allow the arms 718 to move rearward under tension of springs 783, thus allowing the locking arms 717 to return to normal by the action of the springs 782. The shaft 707 will restore such hammers 715 as have been released and return them to their normal position. To provide for the automatic printing of ciphers to the right of a figure of value, we employ the familiar method of having overlapping tails 717ᵈ on the hammer lock arms 717. The tails 717ᵈ project toward the right to overlie the hammer lock arm 717 of the next lower denomination, and release such arms 717 when the said arms of higher denominations are tripped in the usual manner. This insures all the arms 717 of lower order being released from their respective hammers 715.

*Operation*

*Addition.*—When it is desired to add numbers, a depression of the numeral key places the same in the path of the corresponding projection on the previously described index blade. On the forward stroke of the handle, the index blades move forwardly and contact with the depressed numeral key causing through the previously described mechanisms, the rack arms to place their type bars in a printing position equal to the value of the depressed numeral key. The previously described flipper mechanism on the right of the machine functions so that the cams controlling the accumulator throws the accumulators out of mesh with the rack arms on the forward stroke of the handle and into mesh on the return stroke, leaving the added amount in the accumulator.

*Subtraction.*—In subtraction, the same operations are performed with the exception that the flipper mechanism, through the accumulator cams, force the accumulators into mesh with rack arms on the forward stroke of the handle and out of mesh on the return stroke, causing the accumulators to rotate in the opposite direction from adding, and thus taking the borrowed amount from the accumulator.

*Sub-total.*—A depression of the sub-total key releases a latch that governs the total mechanism. Through the totaling mechanism a pin shaft is revolved, releasing the total hooks successively, by means of pins, equally spaced in a spiral. The total hooks contact the pins in the accumulators while the rack arms force the type bars to the printing position. On both strokes of the handle the accumulators remain in mesh with the rack arms, owing to the flipper rock arm mechanism. On the return stroke of the handle, the totaling mechanism is restored, causing the total hooks to disengage the pins in the accumulators thereby allowing the rack arms to restore the accumulators to the same position as before totaling.

*Total.*—The depression of the total key releases the totaling mechanism and the same operations are performed as in sub-total up to the return stroke of the handle, when the accumulators are forced out of mesh with the rack arms by means of the flipper rock arm mechanism, at which time the accumulators will be cleared.

*Counter control keys.*—The counter control keys are self-correcting. Depression of the upper counter control key will throw the upper accumulator unit into mesh with rack arms by means of eccentric collars contacting the accumulator cams. The lower counter control key will throw the lower accumulator unit into mesh by the same means. The middle, or both, counter control keys will force both accumulator units into mesh at the same time.

What is claimed is:

1. In a calculating and recording machine, the combination of a counter having a plurality of denominational orders, normally restrained spring located stops one for each of the orders to stop the elements at zero, actuators one for each order of the counter, a total key, means for holding the actuators inactive, means controlled by the total key for first releasing the stop and then the actuator of every order of the counter beginning with the lowest.

2. In a calculating and recording machine, the combination of a counter having a plurality of wheels, normally restrained spring located stops one for each of the counter wheels adapted to stop the wheels as they reach zero, actuators one for each of the counter wheels, a total key, means for holding the actuators inactive, means controlled by the total key for first releasing the stop and then the actuator of the several orders beginning with the lowest, printing devices one for each wheel of the counter adapted to be positioned by the actuators as the latter are set under the control of the totalizer elements, and means for taking an impression from the printing devices.

3. In a calculating and recording machine, the combination of a counter, means whereby any advance of a lower order element of said counter will effect a proportional advance of the higher order elements, printing elements one for each element of the counter, actuators for the counter elements, a total key, means for holding the actuators inactive, means controlled by the total key for releasing the actuators one after the other, means for setting the printing elements one by one as the actuators are released, and means for taking an impression from the printing elements.

4. In a calculating machine, the combination of a counter the wheels of which may receive amounts simultaneously but which may be turned to zero successively, actuators one for each wheel, a keyboard having a plurality of banks of amount keys, a total key, means controlled by the amount keys for causing the actuators to simultaneously operate the counter wheels in item entering operations, and means controlled by the total key for causing the actuators to successively operate the counter wheels in totaling operations.

5. In a calculating machine, the combination of a counter the wheels of which may receive amounts simultaneously but which may be turned to zero successively beginning with the lowest, actuators one for each wheel, a keyboard having a plurality of banks of amount keys, a total key, normally restrained spring located stops for the wheels for stopping them at zero position in totaling operations, means controlled by the amount keys for causing the actuators to simultaneously operate the counter wheels in item entering operations, means controlled by the total key for holding the actuators inactive, and means controlled by the total key for causing the stops and then the actuators to be released one after the other beginning with the lowest.

In testimony whereof I hereunto affix my signature.

EDNA B. GARDNER,
*Administratrix of the Estate of Clyde Gardner, Deceased.*